US006760175B2

(12) United States Patent
Smith

(10) Patent No.: US 6,760,175 B2
(45) Date of Patent: Jul. 6, 2004

(54) ADAPTIVE ACTUATOR RADIAL POSITIONING TO EXTEND MAGNETIC DISK DRIVE LONGEVITY

(75) Inventor: Gordon James Smith, Rochester, MN (US)

(73) Assignee: Hitachi Global Storage Technologies (NL)

( * ) Notice: Subject to any disclaimer, the term of this patent is extended or adjusted under 35 U.S.C. 154(b) by 421 days.

(21) Appl. No.: 09/814,335

(22) Filed: Mar. 21, 2001

(65) Prior Publication Data

US 2002/0135922 A1 Sep. 26, 2002

(51) Int. Cl.[7] .............................................. G11B 15/18
(52) U.S. Cl. ........................... 360/69; 360/75; 360/128
(58) Field of Search ........................... 360/69, 75, 137, 360/74.1, 70, 128

(56) References Cited

U.S. PATENT DOCUMENTS

| 5,309,301 | A | * | 5/1994 | Gregory et al. | ............. 360/137 |
| 5,612,830 | A | * | 3/1997 | Gregory et al. | ............... 360/69 |
| 5,793,553 | A | * | 8/1998 | Smith | ........................ 360/74.1 |
| 5,850,321 | A | * | 12/1998 | McNeil et al. | ............ 360/246.2 |
| 6,356,405 | B1 | * | 3/2002 | Gui et al. | ...................... 360/70 |

* cited by examiner

Primary Examiner—David Hudspeth
Assistant Examiner—K. Wong

(57) ABSTRACT

In a rigid magnetic disk drive data storage device, the protective lubricant coating on the magnetic disk migrates toward the outer diameter during operation with the result that the radially inward portions of the data surface become depleted. Further, the depletion is nonlinear across the band of data tracks. Since most of the operating time in a typical application is consumed by idle periods between read and write commands, it is necessary that the slider be positioned during such periods where device life shortening head-disk contacts are least likely. The present invention adaptively allocates the idle position to the outermost data tracks where the most robust lubricant film remains. However, to avoid a contaminant buildup that could lead to a catastrophic head crash, it is necessary to periodically sweep the disk surface by accessing the innermost diameter of the surface and progressively moving the transducer carrying slider to the outermost diameter track to sweep any debris radially outward.

11 Claims, 4 Drawing Sheets

ADAPTIVE ACTUATOR RADIAL POSITIONING TO EXTEND MAGNETIC DISK DRIVE LONGEVITY

FIELD OF THE INVENTION

The invention pertains to rigid magnetic disk drives and more particularly to a method of controlling the idling location of the transducer supporting sliders over the disk surface in response to the migration disk surface lubricant over time to extend the useful life of the drive.

BACKGROUND OF THE INVENTION

When rigid magnetic disks are manufactured, a typical lubricant is applied to protect the data surface from damage arising from occasional, accidental contact with the transducer head that flies over the surface during disk drive operation. The lubricant is normally a type that forms a chemical bond with the underlying disk surface coating. However such bonding is limited to a thin layer at the interface surface, with the result that a thin film of lubricant is bonded and stationary while the remainder is mobile and subject to migration when subjected to centrifugal forces as the disk rotates at high rotational velocities or head pressure as the head flies over and is supported above the surface by a film of air.

Centrifugal forces cause the lube to migrate toward the outer edges of the disks leaving the inner radii with less lube and therefore more susceptible to wear during intermittent slider-to-disk contact. If sliders are allowed to idle near the inner tracks after the lube has migrated from that vicinity, the result will be more frequent slider-disk contact that will accelerate failure.

SUMMARY OF THE INVENTION

This invention recognizes the occurrence of lubricant migration toward the perimeter of the disk as a result of high rotational speed disk rotation. If sliders are allowed to idle near the inner diameter tracks after lube has migrated from that location, failure will be accelerated. After a power on operational time period, during which experience has shown that significant lube migration has taken place, the sliders are moved during idle time toward the outer (larger radius) tracks to reduce the amount of time the sliders spend over the low lube regions at smaller radii on the disk surfaces. Initially, the lube thickness is substantially identical over the entire disk data surface. However, it has been found that after a period of about three months of continuous operation (spinning of the disks) much of the mobile portion of the lube has migrated toward the outer radius of the disk surface, leaving the inner radius tracks with little but the bonded lubricant remaining.

One response to the problem is to change the track distribution for idle to follow the lube migration over time. At low power on hours, the track distribution is broad and covers the entire disk surface. This is important because it prevents any area of the disk from becoming a collection area for debris. If, for example, an inner radii region of the disks were completely neglected during idle, a ridge of debris may develop at the edge of the idle zone. An analogy is the debris that accumulates at the edge of highways where vehicles seldom pass over. If a car, for example, moves onto the shoulder of a highway, it is likely that some debris will be hit. In the same way, if debris collects at the edge of an idle zone, it can cause a head crash when struck for the first time. Therefore, it is necessary to periodically sweep the entire disk data surface from inner diameter to outer diameter even after much of the lube has migrated to the outer disk radii and the idle function has been modified to position the sliders only over disk surface portions that are most adequately lubricated.

Thus, although the sliders are controlled to idle over a band of tracks at the outer diameter of the disk data surfaces to match the lube migration, the sliders are periodically moved to the innermost track and then moved to the outer diameter track in order to sweep the entire disk surface and eliminate debris.

DETAILED DESCRIPTION

Figure 1:
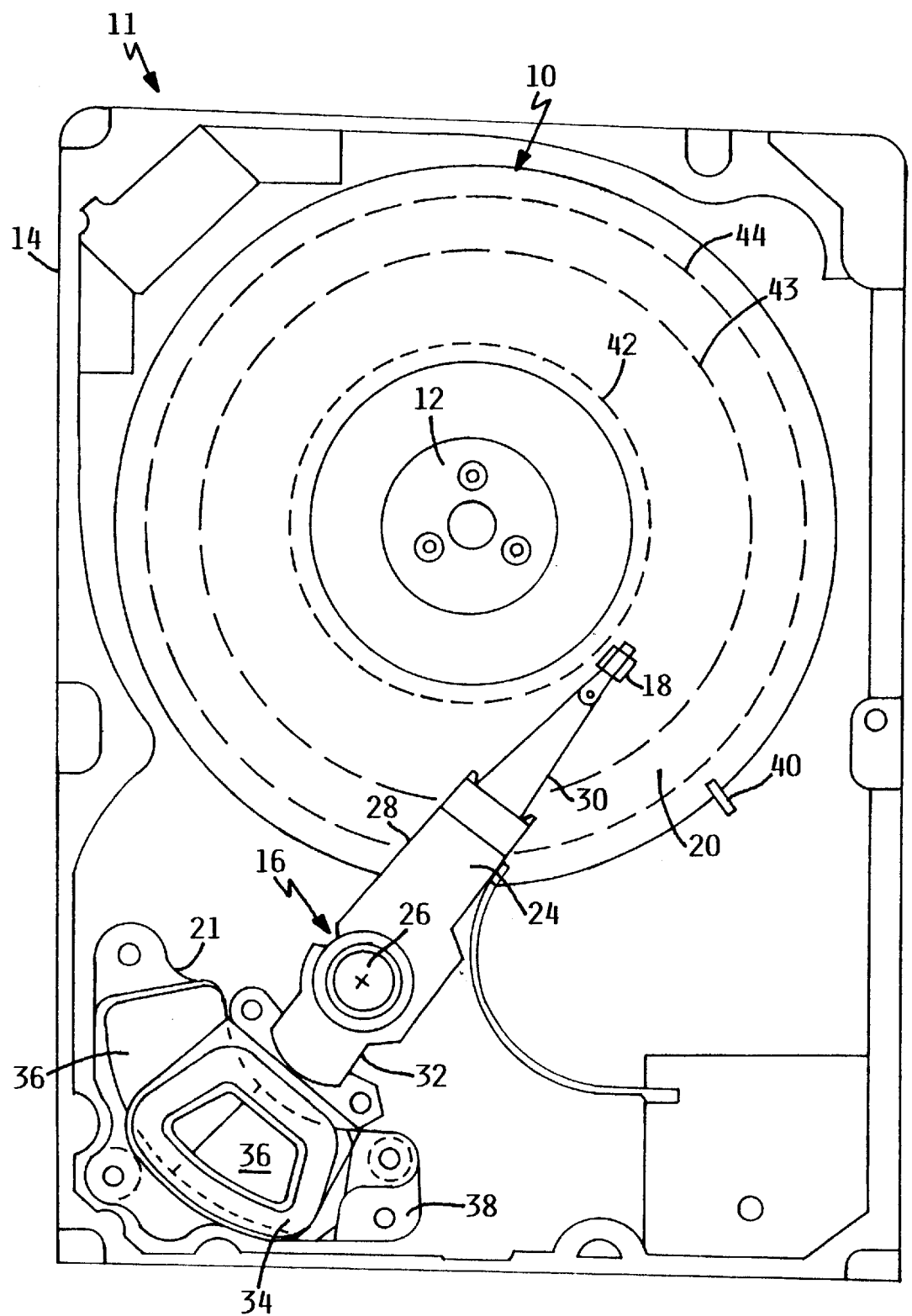
FIG. 1 is a plan view of a typical disk drive with the cover and portions of the voice coil motor removed to illustrate the principal assemblies of such a device.

FIG. 1 illustrates a typical rigid disk drive 11 for storing data including one or more disks 10 mounted for rotation about a spindle 12 which is supported on a rigid base or frame 14. An actuator assembly 16 carries the sliders 18 that carry the transducers that record data on and read data from surfaces 20. Actuator assembly 16 includes a stationary portion 21 secured to base 14 and a pivotable portion 24 which pivots about a stationary post 26. Actuator arms 28 carry flexures 30 which in turn support the sliders 18 that confront the disk surfaces. The flexure 30 allows the slider 18 to move toward and away from the disk surface 20 and a gimble connection (not shown) between flexure and slider allows the slider to pitch and roll during flight. An arm 32, at the side of the pivotable actuator assembly opposite the transducer carrying arms 28, supports a voice coil 34 which is part of the voice coil motor (VCM) that drives and controls the pivotal motion of the actuator assembly. The VCM includes permanent magnets 36 supported on the bottom plate 38 formed of magnetically permeable material. An upper plate member (not shown) of magnetically permeable material is attached to the portion 21 to form a flux path which is interrupted by a gap across which magnetic flux flows. The coil 34, supported on an arm 32, is positioned in the air gap and drives the actuator pivotable portion one direction when current flows through the coil in one direction and drives the actuator pivotable portion in the opposite direction when the current through the coil is reversed. When the drive is shut down, the actuator is pivoted toward the outer diameter of the disk where the flexures 30 engage ramps 40 and cause the sliders to be lifted away from the disk surface 20 before disk rotation is stopped, to prevent sliders from landing on the disk surface. A cover (not shown) is secured to base or frame member 14 to form a hermetic seal and thereby exclude particulate or contaminant materials from the enclosure.

One the disk surface 20, the entire band of data tracks extends from an innermost diameter data track 42 to an outermost diameter data track 44. The one third of the tracks adjoining the outer diameter extends from track 43 to track 44. The remainder of the data tracks from track 42 to track 43 are the two thirds of the tracks adjoining the inner diameter of the data recording surface.

Rigid magnetic data storage disks have a lubricant applied to the surface during manufacture which is of uniform thickness and can be characterized as having a fixed or bonded portion, that forms a chemical bond with the material of the disk surface to which the lube is applied and a remainder that is mobile. When the disk is rotated in a disk drive, the mobile lubricant is dispersed over time and migrates toward the outer diameter of the disk. After three to six months of continuous operation there is probably no more than the bonded lube resident at the inner diameter of the disk storage track band. This leaves the inner tracks of the data storage surface with less lubricant causing that portion of the data surface to be more vulnerable to the occasional disk-slider contact that can damage the disk coatings and is cumulatively the most common cause of ultimate drive failure. To overcome this redistribution of effective disk lubrication, it is necessary to adaptively adjust drive operation to achieve extended drive life.

Since in most disk drive applications the majority of time during operation is spent idling between read or write data commands, the idle routine offers the greatest opportunity to adaptively control slider position to assure that the slider flies over an adequately lubricated surface of the disk. In the present invention this is achieved by causing the slider to idle variously over the outer one third of the data track band where lube migration has least reduced the mobile portion of the lubricant coating.

Positioning over an adequately lubricated surface can be accomplished by randomly positioning the slider during the idle routine nearer the outermost track 44 (FIG. 1) than the innermost track 42. Typically the outer one third of the data tracks, from track 43 to track 44 is the preferred site for allowing the sliders to idle. The slider should be allowed to dwell in one location for only a limited time and thus after a prescribed time, the dwell at this location is terminated and the idle routine recycled to position the slider at another random location within the track band including the radially outer one third of the data tracks.

Another mode of slider positioning is to randomly position the slider within the radially outward third of the data tracks and thereafter advance or index the slider to the outermost track. When the outermost track is reached, the advance and dwell over the disk surface is terminated and the routine recycled to again randomly position the slider. This mode of operation causes the period of slider idle dwell to increase to a maximum at the outermost track location. This would tend to parallel the distribution of lube caused by migration which after extensive disk drive operation tends to diminish lube over much of the disk to only the fixed with the mobile lube being continuously more concentrated at the outer diameter of the data surface.

Although restriction of the head idle location to the outer tracks of the data band assures that the slider idles over the surface with optimum lubrication, further action must be taken to assure that such restriction of the slider location does not cause an adjacent buildup of a ridge of debris that could lead to catastrophic failure. To prevent a localized buildup of debris, it is important to periodically sweep across the data surface during the idle routine. Periodically, the sliders are moved to the innermost data track location and progressively moved to the outermost diameter to sweep the surface and urge any particulates or other contaminant material toward the outer edge of the disk. This action tends to move contaminants away from the data surface before any accumulation can occur that is capable of slider or transducer damage or the destruction of recorded data.

Figure 3:
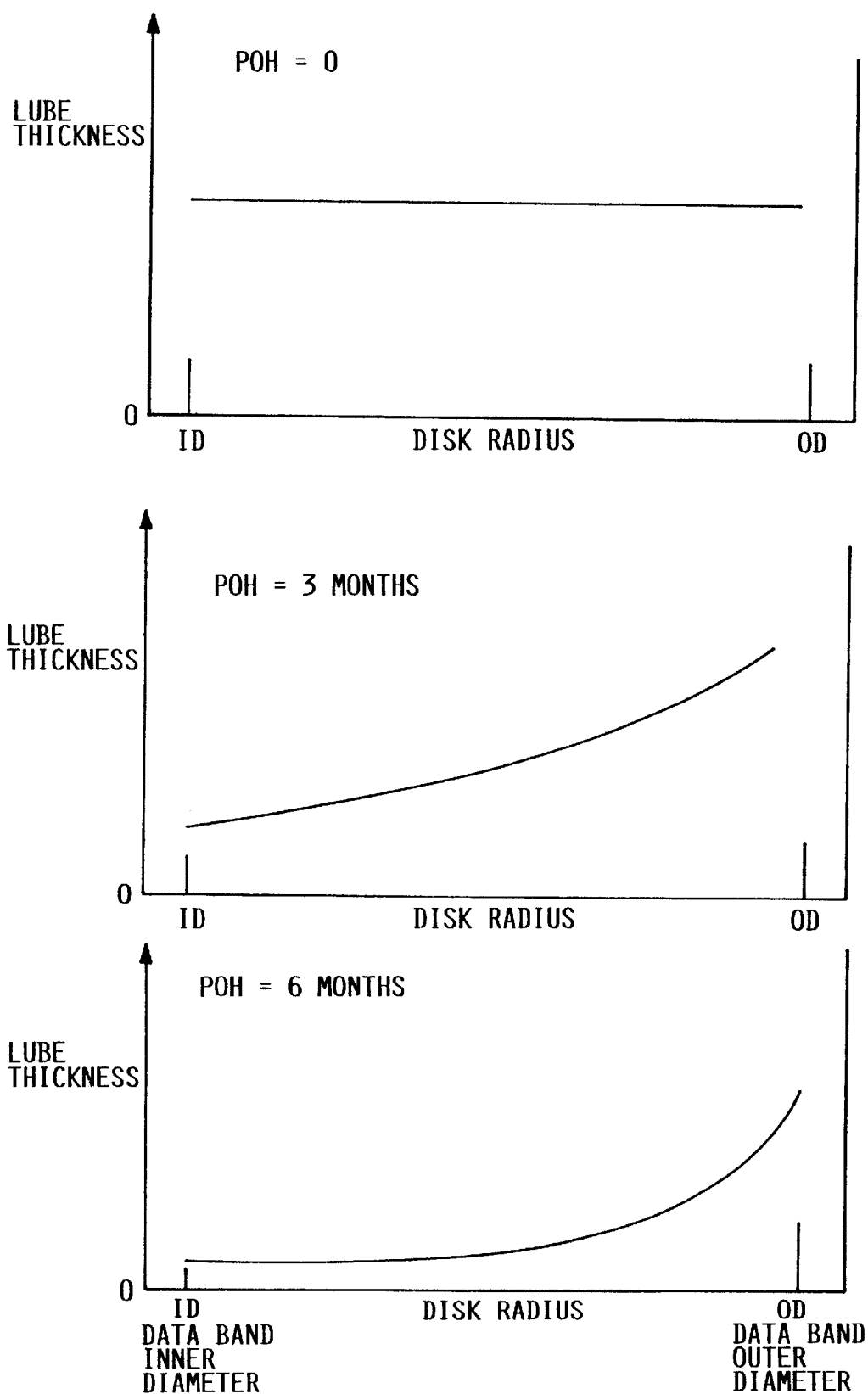
FIG. 3 graphically illustrates the radial distribution of lubricant across the disk data band at operating times POH=0, POH=3 months, and POH=6 months.

FIG. 3 illustrates why the disk radii used during idle should mimic or adapt to the lube thickness radial distribution. As shown in the upper graph, at POH=0 the lube has a uniform thickness over the entire disk surface with the result that lube thickness is not a factor in selecting head position since an adequate lube thickness exists at every location. As time progresses (to POH=3 months in the middle graph and POH=6 months in the lower graph of FIG. 3) the lubricant thickness increases toward the outer disk diameter (larger radii) and decreases at the inner diameter (smaller radii). The idle time radial position of the sliders should track the radial distribution of lubricant so that as the time (POH) increases, more of the idle time is spent at the outer diameter. For the reasons discussed above, the adaptive idle routine should be interrupted by a periodic sweep across the disk surfaces.

Figure 2A:
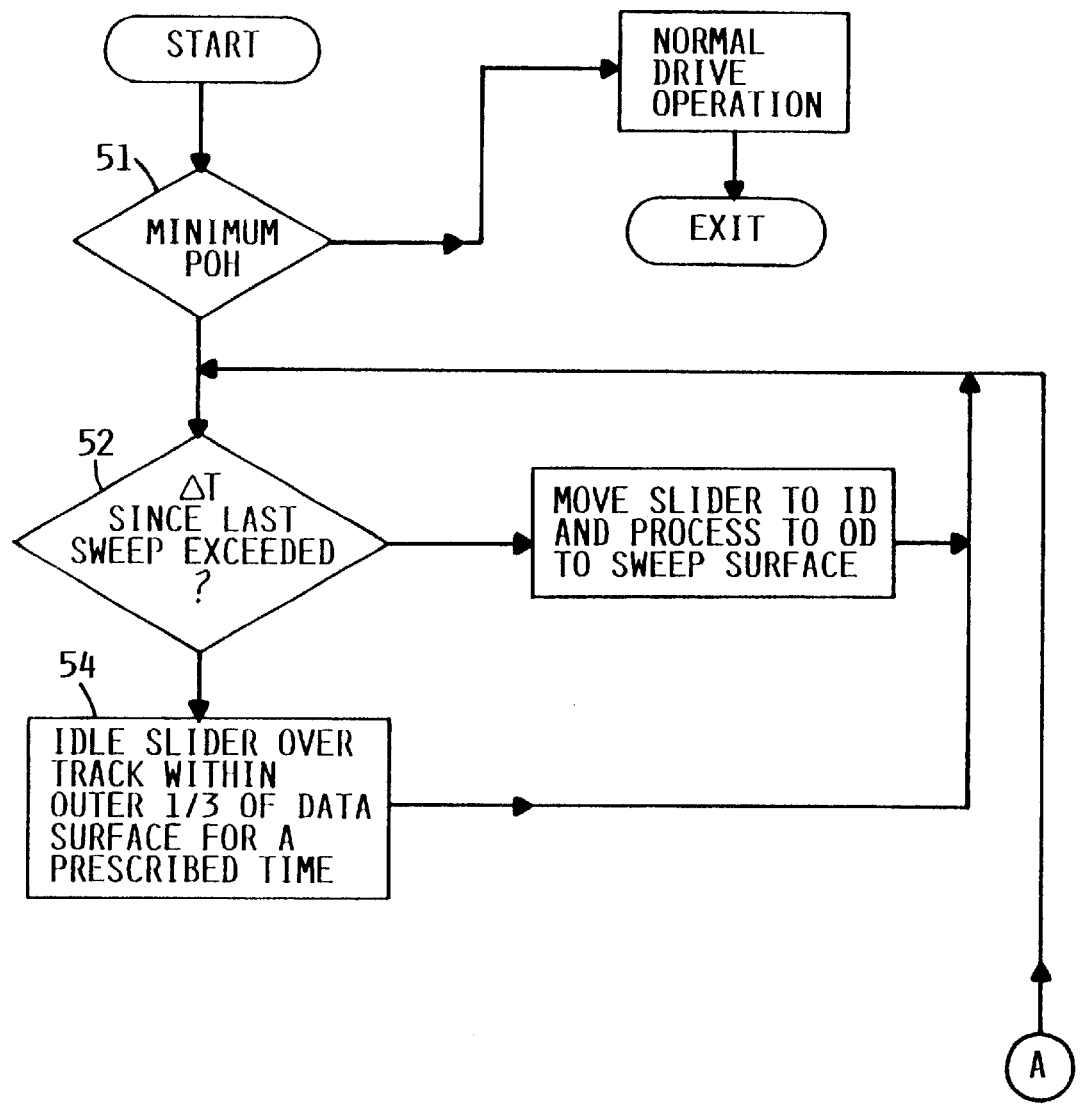
FIG. 2 is a flow diagram illustrating a portion of a disk drive control sequence including the idle routine of the present invention.
Figure 2B:
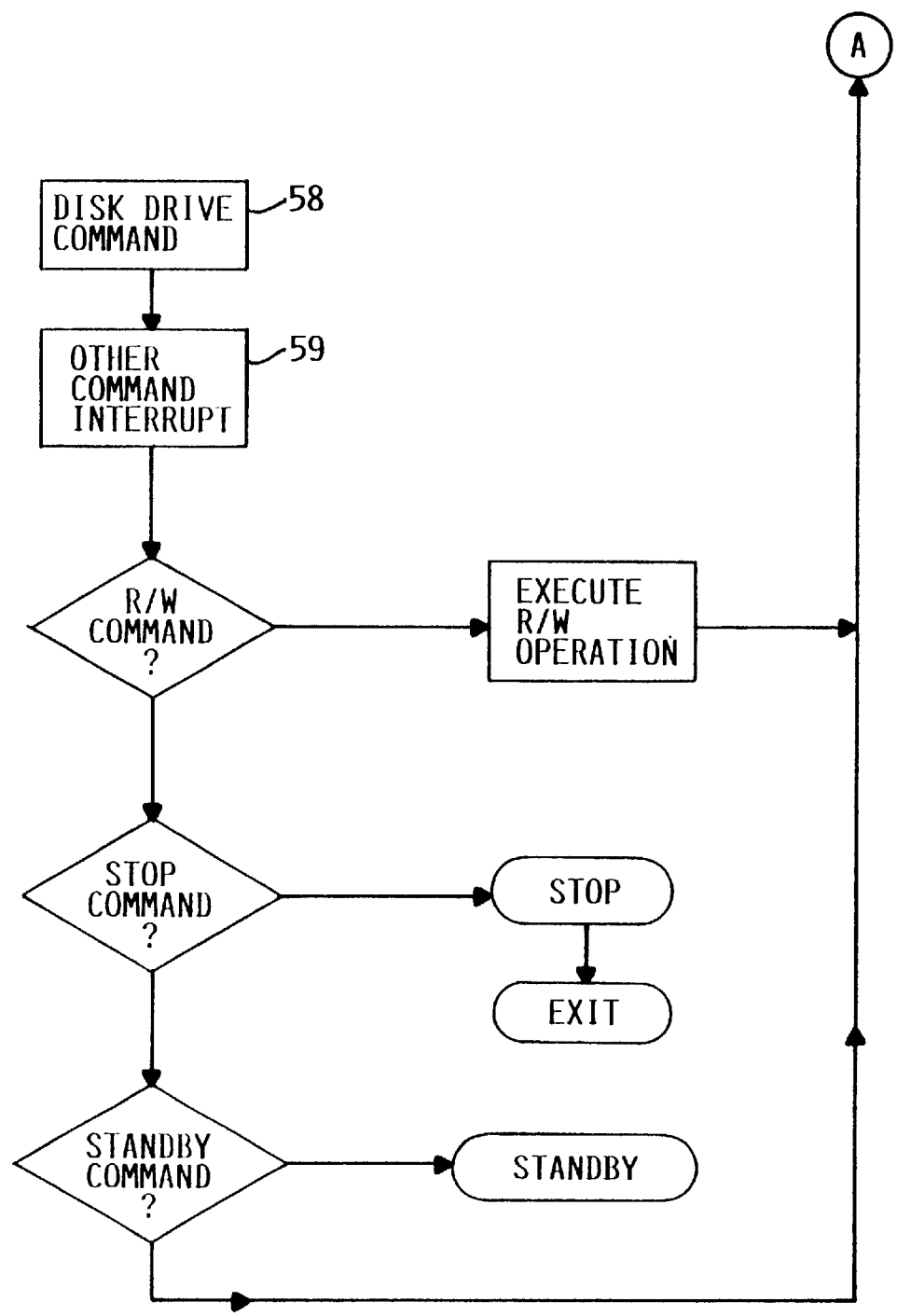

FIG. 2 is a flow diagram illustrating an embodiment of the present invention for the control of the slider position during the operational idle periods between disk drive commands. After start, a decision is made at 51 which determines whether the drive has been in operation for a minimum number of power on hours (POH) indicative of the occurrence of significant lube migration resulting in material lube depletion in the region of the inner tracks of the track band used to store data. Prior to significant lube migration, the lubrication over the entire surface is sufficiently uniform to permit the head to idle at any radial location above the disk in accordance with normal drive control sequences.

When the predetermined POH value indicative of disk lubricant migration has been exceeded, the idle control method of the present invention is invoked. Initially it is determined at block 52 whether a time period delta T has been exceeded since the last sweep. If so, the actuator moves the sliders to the innermost track and advances the sliders from track to track to the outermost track to urge any particulates or other contaminants radially outward on the disk surface. Any contaminants encountered during the sweep may be propelled from the disk to be captured by the drive recirculating filter or at least urged beyond the outer diameter of the data surface of the disk over which the slider must fly during drive operation.

After the sweep, the idle routine does not initiate another sweep until the time interval delta T has again elapsed. The idle routine at 54 controls the actuator to place the sliders over tracks within the outer one third of the band of data tracks (from tracks 43 to track 44 of FIG. 1) to assure that the sliders confront an adequately lubricated disk surface when idling between disk drive commands. After a prescribed time, the idle routine returns to block 52 and until the next sweep, again positions the slider over a location within the outer one third of the band of data tracks.

The idling location of the slider over the outer one third of the data track band may be randomly altered during each successive prescribed time period or may be advanced outwardly during successive prescribed time periods to distribute the period of dwell over the entire band of tracks where more adequate surface lubrication is known to be present. Knowing that lube migration is progressive toward the outer diameter, the idle routine may be controlled to have a greater number of idle time periods occur adjacent the outermost track 44 than adjacent track 43 (FIG. 1).

Whenever a drive command 58 is received, the idle routine is interrupted and the command processed at 59. If the command is to read or write (R/W) data, the read or write operation is processed to completion and actuator control is returned to the idle routine. A stop command causes the drive to stop by following shut down procedures and exiting the overall routine. Similarly, a standby command puts the drive system in a power down standby mode until operation is resumed by a start command.

While the invention has been shown and described with reference to preferred embodiments thereof, it will be understood by those skilled in the art that various changes in form and details may be made therein without departing from the spirit and scope of the invention.

What is claimed is:

1. In a rigid disk data storage device wherein an actuator supports one or more transducer carrying sliders that fly over rotating disk data surfaces, during operation, to write data on and read data from concentric data tracks on said disk data surfaces, an actuator control method comprising the steps of:

positioning said actuator to support said one or more sliders over a band of tracks nearer the outermost diameter track than the innermost diameter track of the respective disk data surface when the storage device is operational and idling between actuator control commands; and periodically moving said one or more sliders to the innermost diameter track on the respective data surface and advancing said actuator to move said sliders to the outermost diameter data track to thereby sweep the data surface and urge any debris radially outward on the disk surface.

2. The actuator control method for a rigid disk data storage device of claim 1 wherein said band of tracks comprises the one third of the data tracks adjoining the outermost data track.

3. The actuator control method for a rigid disk data storage device of claim 2 wherein said slider is positioned over a subband of tracks which overlies said band of tracks and is thereafter advanced radially outward to said outermost diameter track.

4. The actuator control method for a rigid disk data storage device of claim 3 wherein said actuator control method is invoked after a predetermined period of operation indicative of significant migration of the mobile lube applied to the disk.

5. The actuator control method for a rigid disk data storage device of claim 3 wherein said step of positioning said actuator comprises randomly positioning said actuator such that said subband of tracks overlies said band of tracks and thereafter advancing said slider to said outermost track.

6. The actuator control method for a rigid disk data storage device of claim 5 wherein said sliders are advanced by radially indexing said slider with each indexing advance being a distance less than the width of said subband of tracks.

7. In a rigid disk data storage device wherein an actuator supports transducer carrying sliders that respectively fly over rotating, lubricated disk surfaces during operation to write data on and read data from concentric tracks on the disk surface, an actuator control method comprising:

determining when said disk storage device has been operating for a time period indicative of significant migration of the disk surface lubricant radially outward over the disk surface; and positioning said actuator during idle mode, when said storage device is operating, but not processing read or write commands, to place said sliders nearer the outermost diameter data track than the innermost diameter data track.

8. The actuator control method for a rigid disk data storage device of claim 7 further comprising the step of periodically, during said idle mode, moving the actuator to position said sliders at the innermost data track and progressively moving said actuator to advance said sliders over the disk data surfaces to the outermost data track, whereby debris encountered on the data surfaces is urged radially outward.

9. The actuator control method for a rigid disk data storage device of claim 8 wherein said step of positioning said actuator comprises locating the sliders at a random position over the disk data surface whereby the subband of tracks which the slider overlies are within the radially outward one third of the data tracks; and further comprising the step of advancing the slider to the outermost data track.

10. The actuator control method for a rigid disk data storage device of claim 9 further comprising repeating the step of locating the slider at a random position following arrival of the slider at said outermost track until the elapsed time causes another sweep of the disk data surface to be initiated.

11. The actuator control method for a rigid disk data storage device of claim 8 wherein the step of advancing the sliders toward the outermost data track is implemented by indexing the sliders across the data surface by increments no greater than the width of the subband of tracks which the sliders overlie at any one time.

\* \* \* \* \*

UNITED STATES PATENT AND TRADEMARK OFFICE
CERTIFICATE OF CORRECTION

PATENT NO. : 6,760,175 B2
DATED : July 6, 2004
INVENTOR(S) : Smith

It is certified that error appears in the above-identified patent and that said Letters Patent is hereby corrected as shown below:

Column 2,
Line 59, "One" should read -- On --.
Line 65, "diameter of the data recording surface." should read -- diameter of the data recording surface. Within a band of tracks, the band of tracks can be divided into subbands- --.

Signed and Sealed this

Twenty-sixth Day of October, 2004

JON W. DUDAS
*Director of the United States Patent and Trademark Office*